(12) United States Patent  
Madabhushi

(10) Patent No.: US 8,577,011 B1
(45) Date of Patent: Nov. 5, 2013

(54) DISTRIBUTED CALL PICKUP GROUP FOR VOIP SYSTEM

(75) Inventor: Pramod Madabhushi, Schaumburg, IL (US)

(73) Assignee: ShoreTel, Inc., Sunnyvale, CA (US)

( * ) Notice: Subject to any disclaimer, the term of this patent is extended or adjusted under 35 U.S.C. 154(b) by 1332 days.

(21) Appl. No.: 11/971,837

(22) Filed: Jan. 9, 2008

(51) Int. Cl.
*H04M 3/42* (2006.01)

(52) U.S. Cl.
USPC ............ 379/212.01; 379/211.02; 379/214.01; 379/265.11

(58) Field of Classification Search
USPC ............ 379/207.02, 207.12, 211.02, 212.01, 379/214.01, 220.01, 265.01, 265.11, 379/266.01, 266.04, 271, 272, 273, 274, 379/352
See application file for complete search history.

(56) References Cited

U.S. PATENT DOCUMENTS

| | | | |
|---|---|---|---|
| 7,492,887 B1* | 2/2009 | Stumer et al. | 379/265.01 |
| 2005/0238157 A1* | 10/2005 | Shaffer et al. | 379/211.01 |
| 2008/0198840 A1* | 8/2008 | Kodaka et al. | 370/352 |

* cited by examiner

*Primary Examiner* — Antim Shah
(74) *Attorney, Agent, or Firm* — Patent Law Works LLP

(57) ABSTRACT

A distributed call pickup group system comprises a call manager having an extension module. The extension module further comprises a group pickup module, a group pickup call stack, a backup group pickup module and a monitoring group pickup module. The extension module controls and manages the functionality associated with the group pickup feature. The group pick module advantageously allows any extension regardless of its location in the system or the switch to which it is connected to be included within a pickup group. The backup group pickup module provides fault tolerance for the pickup functionality such that if a particular switch and its associated group pickup module fail, a backup group pickup module is identified and made operational. The present invention also includes a variety of methods including a method for creating a group pickup list, a method for performing through pickup and a method for backing up group picked up.

18 Claims, 6 Drawing Sheets

DISTRIBUTED CALL PICKUP GROUP FOR VOIP SYSTEM

BACKGROUND OF THE INVENTION

1. Field of the Invention

The present invention relates telephony systems such as that using Voice over Internet Protocol (VoIP). In particular, the present invention relates to a group pickup feature for telephony systems.

2. Description of the Background Art

The prior art includes a variety of distributed telephony systems. Traditional switched network systems have given way to new telephony systems that use VoIP. These VoIP systems offer the same functionality as more traditional switched system such as the ability to transfer calls, put calls on hold, automated attendant functions, hunt groups, etc. These systems also offer additional functionality, for example, call group pickup. Call pickup group is a traditional PBX and key system feature that is used in group work environments. With call group pickup, calls to a pre-designated group of phones can be answered by issuing a pickup command on group pickup number. Thus, the call group pickup feature allows users with the proper class of service to pickup a call on any telephone in a pickup group from any other telephone.

However, existing implementations of the call pickup group feature have a number of shortcomings. First, if the switch or server becomes non-operational for any reason, the call pickup group features not available. Second, prior art systems typically include restrictions as to until which phones or endpoints can be included within a call pickup group. For example, the endpoints are often limited to those endpoints directly connected to the switch or at a particular location. Third, typically the prior art only allows an extension to be assigned to a single pickup group. Fourth, existing systems that provide a call pickup group feature are very difficult to configure. In some cases, it can only be done by a system administrator. Were it can be done by the user, it is very difficult to step up and add or remove users from pickup lists and manage the lists. This severely limits the use and application of pickup groups.

SUMMARY OF THE INVENTION

The present invention overcomes the deficiencies and limitations of the prior art by providing a system and method for implementing a call pickup group feature. In one embodiment, the system comprises a call manager having an extension module. The extension module further comprises a group pickup module, a group pickup call stack, a backup group pickup module and a monitoring group pickup module. The extension module controls and manages the functionality associated with the group pickup feature. The group pick module advantageously allows any extension regardless of its location in the system or the switch to which it is connected to be included within a pickup group. The backup group pickup module provides fault tolerance for the pickup functionality such that if a particular switch and its associated group pickup module fail, a backup group pickup module is identified and made operational. The present invention is particularly advantageous over the prior art because it allows any extension anywhere in the system to be added to a pickup group, allows the pickup group to be assigned, associated and operational on any switch in the system, provides redundancy by allowing an extension to be part of multiple pickup groups and pickup group failover. The present invention also includes a variety of methods including a method for creating a group pickup list, a method for performing through pickup and a method for backing up group picked up.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
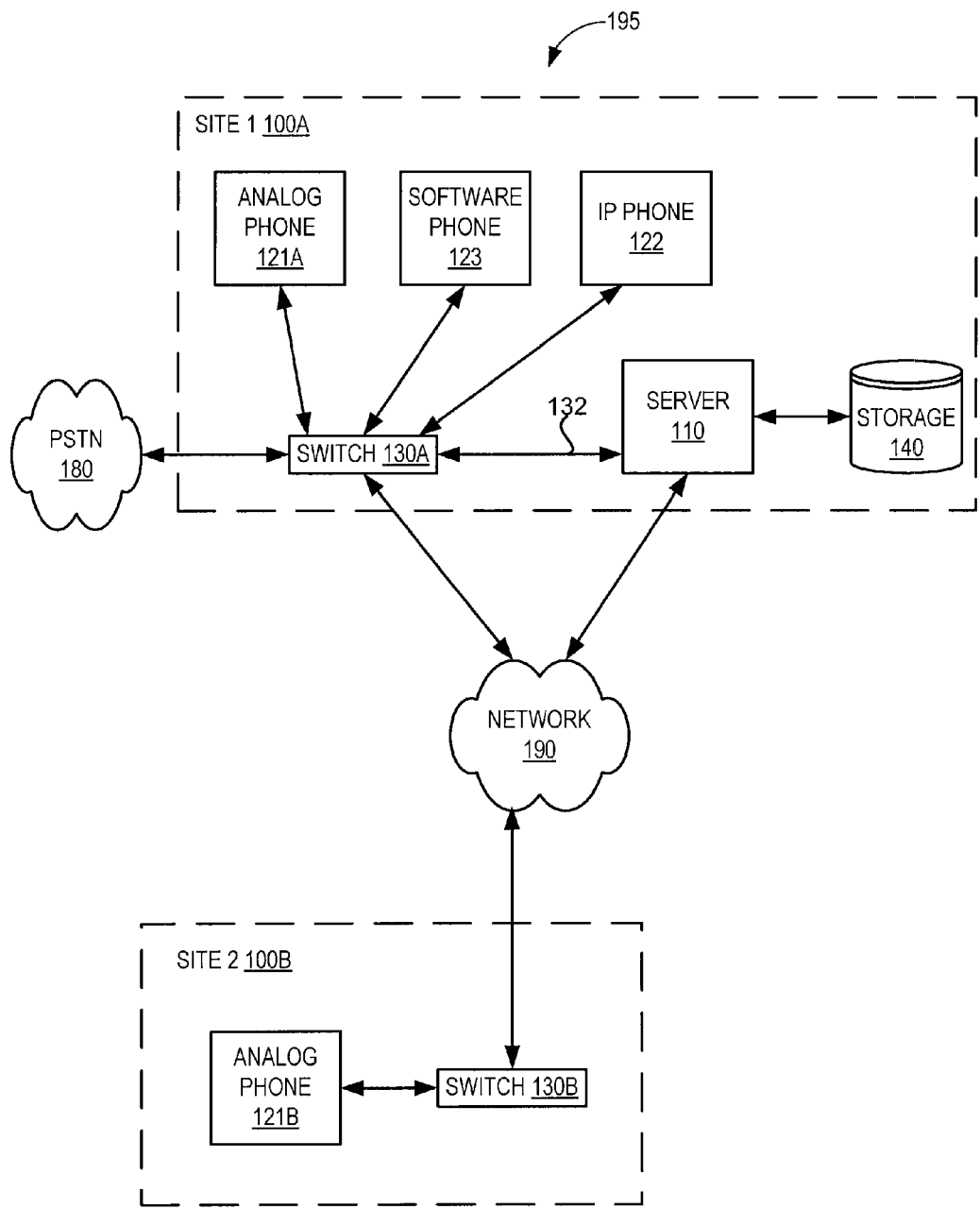
FIG. 1 is a high-level block diagram illustrating a functional view of a distributed telephony system according to one embodiment of the present invention.

A system and method for providing call group pickup capabilities for a telephony system is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to system operation and particular hardware. However, the present invention applies to any type of computing device that can receive a data and commands, and any peripheral devices providing services.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs and magnetic optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

Enterprises often have several offices or call centers that are located in a plurality of disparate locations. To interconnect all of these sites, enterprise telephony systems have been developed. Enterprise telephony systems, which comprise a distributed set of voice switches and servers, offer enterprise applications enabled by the integration of computer systems with telephony services. The software that supports the computer-integrated functionality is generally implemented as a client-server environment in which the participants or clients (distributed telephony users) communicate with a server. Computer-integrated features rely not only on a server's application platform but also on the availability of the network that connects the switches, servers and application services.

FIG. 1 illustrates a block diagram of a distributed telephony system architecture, according to one embodiment of the present invention. The illustrated embodiment of architecture 195 includes a first site 100A and a second site 100B. As used herein, a site represents a grouping of resources. In the illustrated embodiment, the two sites 100A, 100B are communicatively coupled via a network 190. One skilled in the art will note that sites 100A, 100B can be physically distinct from each other or merely topology-related groupings that are not in physically distinct locations. The system 195 architecture in FIG. 1 is used only by way of example. While FIG. 1 illustrates two sites, the present invention applies to any system architecture containing one or more sites.

The first site 100A includes a server 110, a switch 130A, three endpoints (analog phone 121A, IP phone 122 and software phone 123) and a storage device 140. The switch 130A represents a Voice over Internet Protocol (VoIP) device to which a number of endpoints can be coupled, such as analog phones 121, IP phones 122 and software phones (softphones) 123. In the illustrated embodiment, the switch 130A is coupled to the network 190. The switch 130A is also coupled to the public switched telephone network (PSTN) 180 via an analog or digital trunk line (e.g., a T1 or E1 interface). In the illustrated configuration, the switch 130A provides an interface for calls originating from or terminating on the PSTN 180. Although only a single switch 130A is shown in FIG. 1, those skilled in the art will recognize that a particular site such as site 1 100A may include a plurality of switches. The switch 130 will be described in more detail below with reference to FIG. 2.

An endpoint enables a user to carry on a phone call. Although in the illustrated embodiment the first site 100A has three endpoints (one analog phone 121A, one IP phone 122 and one softphone 123), in other embodiments the first site 100A has different numbers and types of endpoints. An endpoint is coupled to the switch 130, the server 110, or both. Each of the endpoints can also include a display device (not shown) that is used in conjunction with the phone of the endpoint.

An endpoint has a user interface to send data to and receive data from a user. The analog phone 121A has, for example, a Telephone User Interface (TUI) that sends data through a speaker and receives data through a microphone and a keypad. The IP phone 122 has, for example, both a TUI and a graphical user interface that sends data through a display device associated with the IP phone 122. In one embodiment, the IP phone's graphical user interface also receives data from a touch screen display device associated with the IP phone 122. The softphone 123 has, for example, a software application that runs on a computer and sends data through a display device and a speaker and receives data through a microphone, a keyboard and a pointing device.

The server 110 is configured to implement features or functions of the telephony system in accordance with the present invention. The server 110 is coupled to the network 190 and although not shown can also be coupled to one or more endpoints, such as IP phone 122 and softphone 123. The server 110 implements a server architecture according to one embodiment of the present invention. Server 110 includes a processor. The processor can be a conventional processing device, such as a general-purpose microprocessor. Server 110 also includes a memory. The memory includes program instructions or functional units that in one embodiment implement features of the present invention. Specifically, the memory includes a telephony management software (TMS) unit, a telephony application programming interface unit and a directory unit. In one embodiment, the memory also includes one or more application units that interact with the TMS unit and the TAPI unit to enable a specific computer-integrated function. An application unit uses the TAPI unit to exchange data with the TMS unit. The TMS unit is able to communicate with and manage one or more switches 130. For example, with reference to FIG. 1, the TMS unit included in the server 110 can manage the switches 130A, 130B. Through the TAPI unit, the TMS unit presents an application with computer-telephony integration (CTI) view of these switches 130A, 130B. This allows the application to manage the switches 130A, 130B. Such switches 130A, 130B operate without an associated TMS unit if CTI features are not being used.

The server 110 includes one application unit-directory unit. In general, the directory unit enables a phone to access a directory and use the directory in conjunction with other phone functions. In one embodiment, directory unit is implemented as a service that interacts with TMS unit. Communication or data exchange is between TMS unit and directory unit. The directory unit can be distributed among computing devices as is known to one of skill in the art. For example, the functionality enabled by directory unit can be implemented in a client-server fashion by having the client (user's local system, such as a general-purpose computer or endpoint) perform some functions and having the server 110 (directory unit) perform others. As another example, some or all of the functionality enabled by directory unit can be implemented by having a switch 130 perform some or all functions.

The storage device 140 contains directory information, including directory entries and associations between directories and phones. In one embodiment, the storage device 140 also contains information regarding the directory context of a phone. Alternatively, this information can be stored in the server 110. In one embodiment, directory context information includes one or more of the following: 1) a portion of a directory that is currently available for presentation (the portion could include, e.g., information from all entries versus information from entries that meet certain criteria); 2) a filter (if any) that was used to determine the entries in (1); 3) of the entries in (1), which entries are currently being presented by the phone; 4) of the entries in (3), which entry is currently navigated to; 5) what call function (if any) the directory was invoked during. Note that since the directory context specifies the information presented by the phone, storing the directory context enables later determination of what information is being presented by the phone.

Also, note that directory context information need not include all items (1)-(5). For example, if the entire directory and the filter (2) are known, the directory portion available for presentation (1) can be determined. Directory context information will be further explained below. In the illustrated embodiment, the storage device 140 is directly coupled to the server 110. In an alternate embodiment, the storage device 140 is coupled to the server 110 via the network 190.

One skilled in the art will appreciate that additional networking devices (not shown) can be added to the first site 100A, for example, if needed to support additional endpoints, servers 110, switches 130 or other systems. For example, the first site 100A can include a second switch 130 and an edge router to couple the first site 100A to the network 190 and to provide local area connectivity for the first and second switches 130A, 130B. One skilled in the art will also recognize that numerous configurations of switches 130 and communications links are contemplated. For example, PSTN links can be coupled to multiple switches 130 at several points within the topology and soft-switches 130 can also be used.

The second site 100B similarly includes an endpoint (analog phone 121B) and a switch 130B. The configuration of the second site 100B demonstrates that a server is not required for each site. Switch 130B of the second site 100B can be managed by server 110 that is illustrated in the first site 100A. A call can involve more than one switch. For example, a call that originates from the PSTN 180 and terminates on an endpoint that is communicatively coupled to switch 130B of the second site 100B involves two switches: switch 130A of the first site 100A and switch 130B of the second site 100B. In addition, each switch 130A, 130B can be managed by a different server 110.

In one embodiment of the present invention, the network 190 is a partially public or a wholly public network such as the Internet. The network 190 can also be a private network or include one or more distinct or logical private networks (e.g., virtual private networks or wide area networks). Additionally, the communication links to and from the network 190 can be wire line or wireless (i.e., terrestrial- or satellite-based transceivers). In one embodiment of the present invention, the network 190 is an IP-based wide or metropolitan area network.

Switch 130

Figure 2:
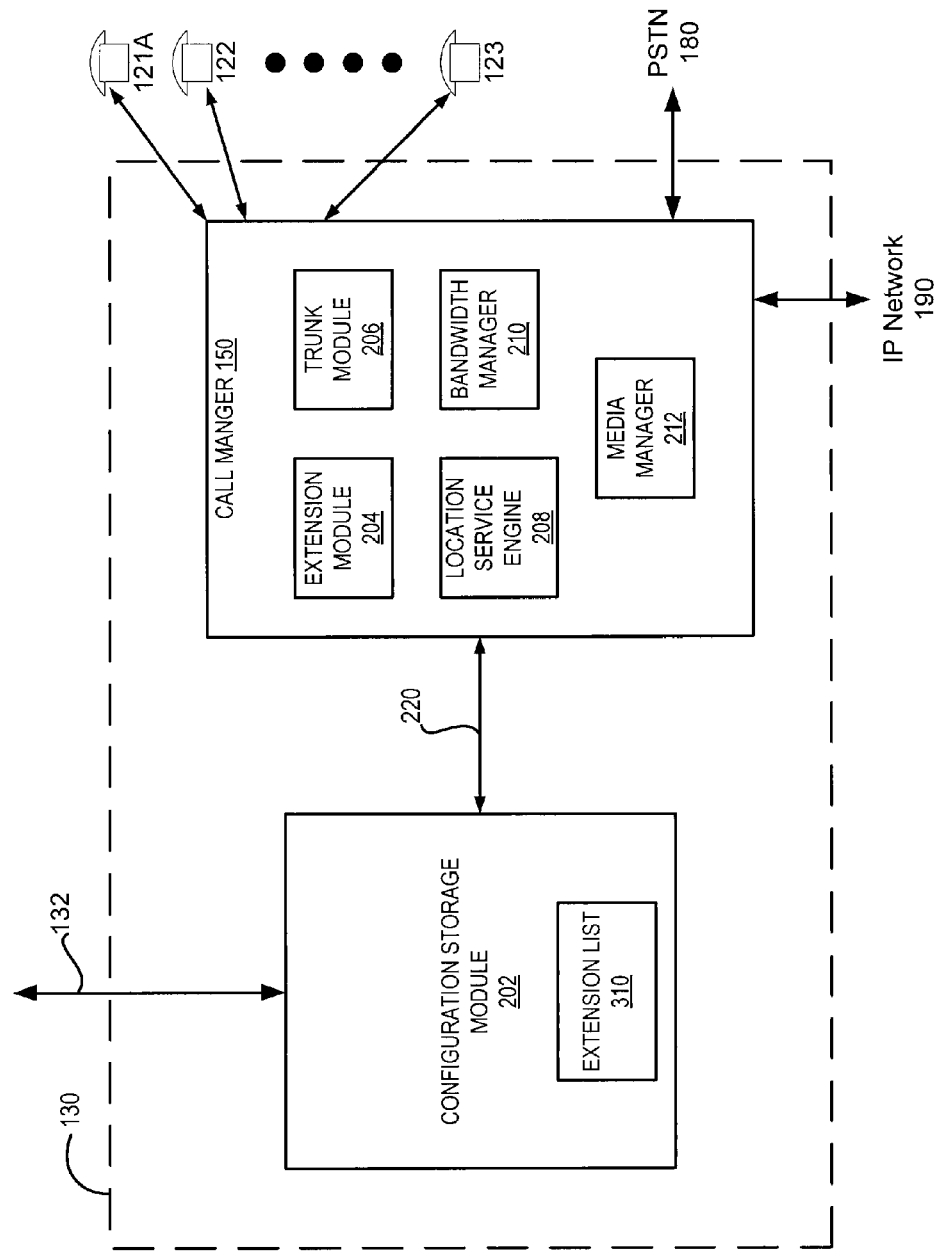
FIG. 2 is a block diagram illustrating a switch according to one embodiment of the present invention.

Referring now to FIG. 2, an embodiment of the switch 130 according to one embodiment of the present invention is shown. In this embodiment, switch 130 is configured to implement features or functions of the present invention. Switch 130 includes a processor. The processor can be a conventional processing device, such as a general-purpose microprocessor. Switch 130 also includes a memory. The memory also includes software and routines (not shown) conventionally used to operate a switch in a VoIP telephony system. For example, the switch 130 includes software routines for performing call monitoring, transferring calls, placing calls on hold, establishing hunt groups, automated attendant functions, etc. The memory also includes program instructions or functional units that implement the features of the present invention. The switch 130 also includes a configuration storage module 202 for storing an extension list 310 (See also FIG. 3) and a call manager 150.

The configuration storage module 202 is for storing preferences, settings and other information utilized by the call manager 150 to perform its functions. In one embodiment, the configuration storage module 202 is a portion of the memory of the switch 130. In order to enable the group pickup feature over the entire telephony system 195, the configuration storage module 202 includes an extension list 310. In one embodiment, the extension list 310 is a list of the extensions available in the entire telephony system 195. For example, the extension list 310 for the system 195 of FIG. 1 includes an extension entry in the extension list 310 for all of the endpoints 121A, 122, 123 and 121B. In another embodiment, the extension list 310 is a list of the extensions available at a site 100A. Those skilled in the art will recognize that in other embodiments the extension list 310 includes hundreds of extensions where a single telephony system 195 has several sites and in each site has tens or hundreds of extensions. Furthermore, those skilled in the art will understand that the extension list 310 can partition any number of extensions of a particular site 100 and thereby enable a particular level of service that includes call group of pickup functionality. The inclusion of the extension list 310 in the switch 130 is particularly advantageous because when operable in conjunction with the extension module 204, it allows a group of pickup list to include or be formed of extensions across the entire telephony system 195. More specifically, a group of pickup list may be distributed in any number of ways across the entire telephony system 195. This means that a group of pickup list may include extensions anywhere in the system 195, coupled to any switch 130A, 130B, and operational as part of any site 100a, 100B.

The configuration storage module 202 is coupled by a signal line 132 to the server 110. The server 110 uses the signal line 132 to download information to the configuration storage module 202. The information downloaded by the server 110 includes the information noted above to allow the call manager 150 to perform its conventional functions. In accordance with the present invention, the server 110 also uses signal line 132 to maintain and keep the extension list 310 current. In other words, any time another call manager 150, server 110 or site 100 adds or removes an extension, that information is propagated to server 110 and server 110 in turn updates the extension list 310 stored in the configuration storage module 202. The configuration storage module 202 is also coupled by signal line 222 the call manager 150. The configuration storage module 202 uses this coupling to provide configuration and other information to the call manager 150.

A device, such as the processor of the switch 130, runs the call manager software application 150 and is coupled to and controls one or more endpoints 121A. 122 and 123 with which it is associated. Call manager 150 offers a user interface through which the user can perform call-related functions. While shown as operational and as part of the switch 130 in FIG. 2, those skilled in the art will recognize that in other embodiments, the call manager 150 may be operational as a separate module in the first site 100 or as part of server 110 of FIG. 1.

Although in the illustrated embodiment the first site 100A has only one call manager 150 in switch 130A, in other embodiments the first site 100A has a different number of call managers 150. Also, more than one call manager 150 can control the same endpoint. The association between a call manager 150 and an endpoint that it controls is accessed through the server 110. Furthermore, although not shown, the second switch 130B includes its own call manager 150.

As shown in FIG. 2, the call manager 150 is coupled to the PSTN 180 and the network 190. The call manager 150 comprises an extension module 204, a trunk module 206, a location service engine 208, a bandwidth manager 210 and a media manager 212.

The extension module 204 functionality of the present invention including creation, modification and operation of group pickup lists. The extension module 204 will be described in more detail below with reference to FIG. 3.

The trunk module 206 is coupled to and controls the interaction between the endpoints 121A, 122 and 123 and the PSTN 180. In particular, the call manager 150/switch 130 is often coupled to a trunk line. The trunk module 206 of the call manager 150 manages the usage of the trunk line by multiple endpoints 121A, 122 and 123 to optimize the usage of the trunk line. The trunk module 206 also manages trunk services such as caller identification, direct inward dial, etc.

The location service engine 208 is usually coupled to the configuration storage module 202 and resolves the dialed numbers (converts raw dialed digits into routable contacts) and routes the calls to the destination endpoints such as phones, trunks, hunt groups, auto attendants, pickup groups etc.

The bandwidth manager 210 is coupled to the network 190 and measures and allocates bandwidth necessary to support the calls handled by call manager 150. For example, video and audio communication functions managed by the call manager 150 typically require a significant amount of bandwidth and small interruptions in bandwidth or quality of service are noticeable to the user with such communication types. The bandwidth manager 210 measures the bandwidth available between endpoints in the network and ensures quality of service for any calls that are active and controlled by the call manager 150. For example, the bandwidth manager 210 can allocate use of particular routers, LANs, WANs or other portions of the network to provide the bandwidth necessary to support the calls going through the switch 130.

The media manager 212 is part of the call manager 150 creates and manages media streams. The media manager 212 also and handles call control and converting audio waveforms to and from Real-time Transport Protocol (RTP) packets. The media manager 212 is coupled for communication with the network 190 and the endpoints 121A, 122 and 123. The media manager 212 performs encoding/decoding in case of analog endpoints and physical trunks; and also performs codec negotiation when call is being setup between two endpoints which are capable of exchanging audio/video data.

Figure 3:
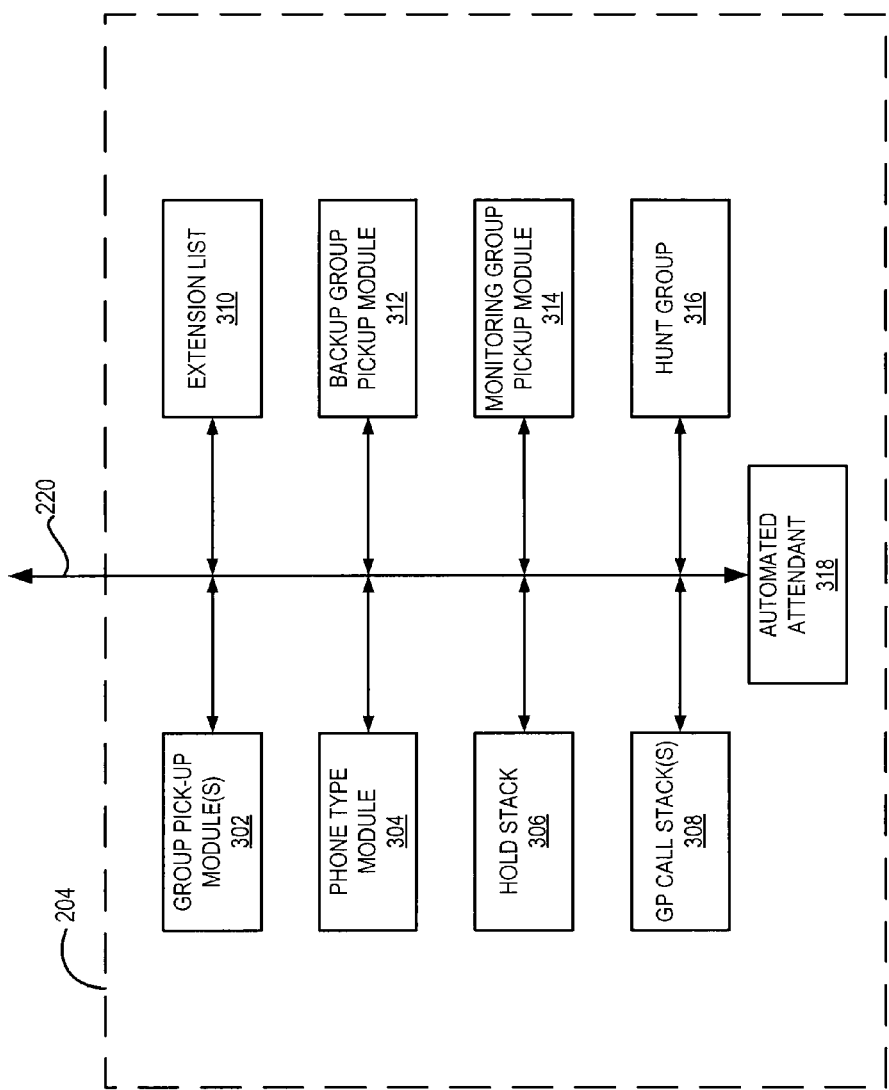
FIG. 3 is a block diagram illustrating a functional view of an extension module according to one embodiment of the present invention.

Referring now to FIG. 3, one embodiment of the extension module 204 is shown. The extension module 204 comprises one or more group pickup module(s) 302, a phone type module 304, a hold stack 306, one or more group pickup call stack(s) 308, an extension list 310, a backup group pickup module 312, a monitoring group pickup module 314, a hunt group module 316 and an automated attendant 318. These components cooperate together to provide the functionality of the present invention. The operation of these modules 302, 304, 306, 308, 310, 312, 314, 316 and 318 can also be better understood with reference to FIGS. 5A and 5B below in addition to the description that follows.

The group pickup module 302 is software and routines for creating a group pickup list, for handling calls associated with a group pickup list, for sending notifications regarding incoming calls associated with a group list and for performing a pickup operation. It should be understood that while only a single group pickup module 302 is shown in FIG. 3, the extension module 204 may comprise a plurality of group pickup modules 302. In one embodiment, a single group pickup module 302 handles and manages any number of group pickup lists that are associated with the extension module 204 and thus the call manager 150 of a particular switch. In a second embodiment, an instance of the group pickup module 302 is created and maintained for each group pickup list operational on the call manager 150. In one embodiment, redundancy can be provided by configuring multiple group pickup lists with the same extensions.

As has been noted above, the present invention is particularly advantageous because a group pickup module can be associated with any switch 130 in the system 195. For example, the group pickup module 302 of FIG. 3 is associated with the switch 130A of the first site 100A since it is operational as part of the extension module and call manager 150 of switch 130A. However, the group pickup module 302 can alternatively be associated with and a part of switch 130B of the second site 100B. In yet another embodiment, the first switch 130A has a call manager 150 that includes a first group pickup module 302, and the second switch 130B has its own call manager 150 that includes a second and different group pickup module 302.

Furthermore, the group pickup module 302 is capable of operating with any extension, whether the extension (and the associated endpoint) is directly connected to the switch 130, or connected to a different switch. For example, if group pickup module 302 is part of the first switch 130A, the group pick a module 302 can have a group extension list that includes any of the endpoints 121A, 121B, 122 and 123 even though endpoint 121B is coupled directly to switch 130B and communicates with switch 130A by way of network 190 and switch 130B. This means that the group pickup module 302 can perform its functions with endpoint 121B even though not directly connected to the endpoint 121B. Those skilled in the art will appreciate how the present invention allows group pickup lists to include different extensions in despair locations anywhere within the system 195, and thereby provide a group pickup function among extensions anywhere in the system 195.

The phone type module 304 is software and routines for determining the device connected to a particular extension. The phone time module 204 determines whether a particular extension is an analog phone, IP phone, or a softphone. Depending on the type of device associated with a particular extension, the phone type module 304 works with the call manager 150 to send signals appropriate for the phone type including both data in its appropriate format as well as control signals according to be capabilities of the phone identified. The phone type module 304 is a conventional type known to those skilled in the art.

The hold stack 306 is a memory portion or storage device for storing list of extensions and corresponding calls. The hold stack 306 is preferably a memory stack used by the call manager 150 to identify parties to call, a caller that is placed other parties on hold, and a list of extensions placed on hold. The call manager 150 pushes an entry of a call, a caller extension and other extension(s) onto the hold stack 306 when a caller places up others on hold. The call manager 150 pops uses that entry to re-establish to call and pops that same entry from the hold stack 306 when the caller takes the other parties off of hold. The hold stack 306 is a conventional type known to those skilled in the art.

The group pickup call stack 308 is a memory portion or storage device for storing a list of extensions and corresponding calls. The group pickup call stack 308 is analogous to the hold stack 306, but for tracking incoming calls associated with a group pickup list that have not been answered or are pending. In one embodiment, the group pickup call stack 308 is FIFO queue. In one embodiment, there is a group pickup the call stack 308 corresponding to each group pickup list created and handled by the extension module 204. When an incoming call associated with a group pickup list is received; the group pickup module 302 sends an indication that there is an incoming call associated with the group pickup list. The group pickup module 302 then adds an entry into the group pickup call stack 308 associated with the group pickup list. The group pickup module 302 removes entries from the group pickup call stack 308 when a call is picked up using a group pickup functionality or answered by the endpoint that received the call. The group pickup module 302 also determines whether a "keep alive" signal has been received for each entry in the group pickup call stack 308 at predetermined times or upon time out. If a "keep alive" signal has not been received; the call is presumed to have ended and is removed from the group pickup call stack 308.

The extension list 310 is a list of the extensions available in the entire telephony system 195. The extension list 310 has been described above with reference to the configuration storage module 202. The extension list 310 here has a similar functionality but also includes one or more group pickup lists and an associated extension. A group pickup list is an explicit group in which telephones or extensions defined within a numbered group can be picked up from any other telephone. This allows for telephones to be in multiple groups does not require the user specify which group to pickup. Each extension list is given an extension, a PG extension, in the system 195. Calls cannot be placed from the PG extensions, and when a user dials the PG extensions the system outputs a reorder tone. Those skilled in the art will recognize that the extension list 310 can include any number of group pickup lists. Additionally, a group pickup list may include any number of extensions regardless of their location. However, in another embodiment, the group pickup list is limited to 20 members and a switch 130 is limited to 16 group pickup lists.

The backup group pickup module 312 is software and routines for providing a backup mechanism for the group pickup functionality. The backup group pickup module 312 provides the system 195 with redundancy for the group pickup functionality. The backup group pickup module 312 provides a failover mechanism when a group pickup module 302 is nonoperational. The group of pickup module 302 could be nonoperational because of the failure of the switch 130, failure of the call manager 150, failure of the extension module 204 or failure of the connections to the switch 130. In one embodiment, the backup group pickup module 312 configures the system 195 such that every pickup group has another pickup group as a backup destination. If the primary pickup group is unreachable for any reason, the pickup request can automatically be forwarded to the backup pickup group. This forwarding function is performed by the backup group pickup module 312. Because of the flexible architecture noted above with regard to the assignment of extensions, pickup groups and switches; an administrative user need only configure the backup and the primary groups on different switches and have the same group extension lists assigned to them. In the event that the primary group is not available, the pickup responsibilities are handled by the secondary group and its associated switch. The backup group pickup module 312 also stores and identifies the group lists for which it is the secondary group.

The monitoring group pickup module 314 is software and routines for monitoring for conditions in the system 195. In particular, the monitoring group pickup module 314 monitors for signals identifying new incoming calls. The monitoring group pickup module 314 determines the destination extension for the incoming calls and compares it with the extension list 310 to determine whether the call is associated with a pickup group handled by this extension module 204 and this call manager 150. If so, the monitoring group pickup module 314 passes the call to the group pickup module 302 for further processing. For example, the monitoring group pickup module 314 can generated and send a call indication signal for processing by the group pickup module 302. The call indication signal provides information necessary to redirect the call. If not, the call is processed as normal by the call manager 150. The monitoring group pickup module 314 also monitors for the availability of primary call groups for which it serves as a secondary call group. If the switch associated with a primary call group becomes unavailable, the monitoring group pickup module 314 signals the backup group pickup module 312 to become active and handle the failover condition. The monitoring group pickup module 314 is adapted for communication with the backup group pickup module 312, the extension list 310 and the group pickup module 302.

The monitoring group pickup module 314 is particularly advantageous because it allows a user at a physically remote site to be notified of an incoming call to a pickup group list, and also allows extensions at that physically remote site to be used to pick up the call. The prior art has no such capability. For example, a user at the second site 100B could be notified on the phone 121B of a call to a pickup group list that the user is a member or wants to monitor even though the other members of the pickup group have extensions at the first site 100A. To accomplish this, the monitoring group pickup module 314 sends a signal to the second site 100B, and in particular, the phone 121B of an incoming call to a pickup group list. This triggers the presentation of an indication of an incoming call to the pickup group list for the user on phone 121B. It could be either a visual or audible indication output by the phone 121B.

Typically in the prior art, the users are physically located at the same site as pickup group members (members in the extension list associated with the pickup group) so when the phone of a member of the pickup group rings, they hear the ringing due to their proximity and issue a pickup command from their extension. Since remote sites were not able to hear the ringing of a phone of a member of the pickup group, remote pickup was not possible for prior art systems.

However, the present invention distributed architecture allows the pickup command issuer and the members in the pickup group to be located anywhere in the system 195 which means they need not be physically located near each other. In such configurations, the monitoring group pickup module 314 allows users to monitor the pickup group and pickup calls of the members of the group from any extension using the call manager 150.

The hunt group module 316 is software and routines for distributing phone calls from a single destination number or extension to a group of several phone extensions. The hunt group module 316 is operational as part of the call manager 150. The hunt group module 316 is coupled for communication with the network 190, the PSTN 180 and the endpoints 121A, 122 and 123. The hunt group module 316 is a conventional type known to those skilled in the art.

The automated attendant 318 is software and routines for automatically transferring callers to a user's extension without the intervention of a receptionist. The automated attendant 318 also provides transfers to any extension by number, a 'dial-by-name' directory to find user extension and transfer to voicemail. Other features of automated attendant 318 include transferring to another outside phone line, connecting two companies via wide-area networking and VoIP and unified messaging. The automated attendant 318 is operational as part of the call manager 150. The automated attendant 318 is coupled for communication with the network 190, the PSTN 180 and the endpoints 121A, 122 and 123. The automated attendant 318 is a conventional type known to those skilled in the art.

Methods

Figure 5A:
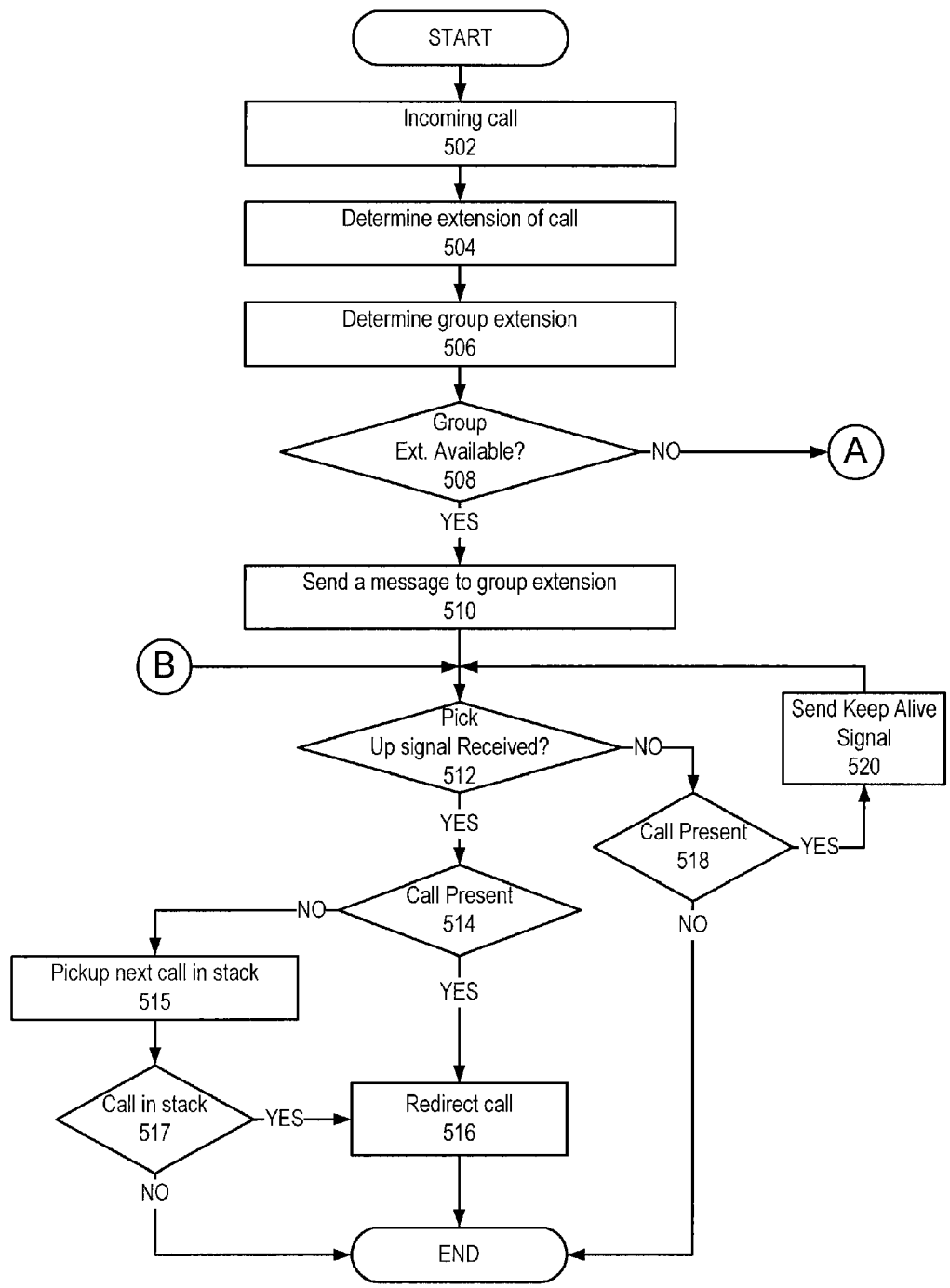
FIGS. 5A and 5B are a flowchart illustrating operation of a call group pickup feature according to one embodiment of the present invention.
Figure 5B:
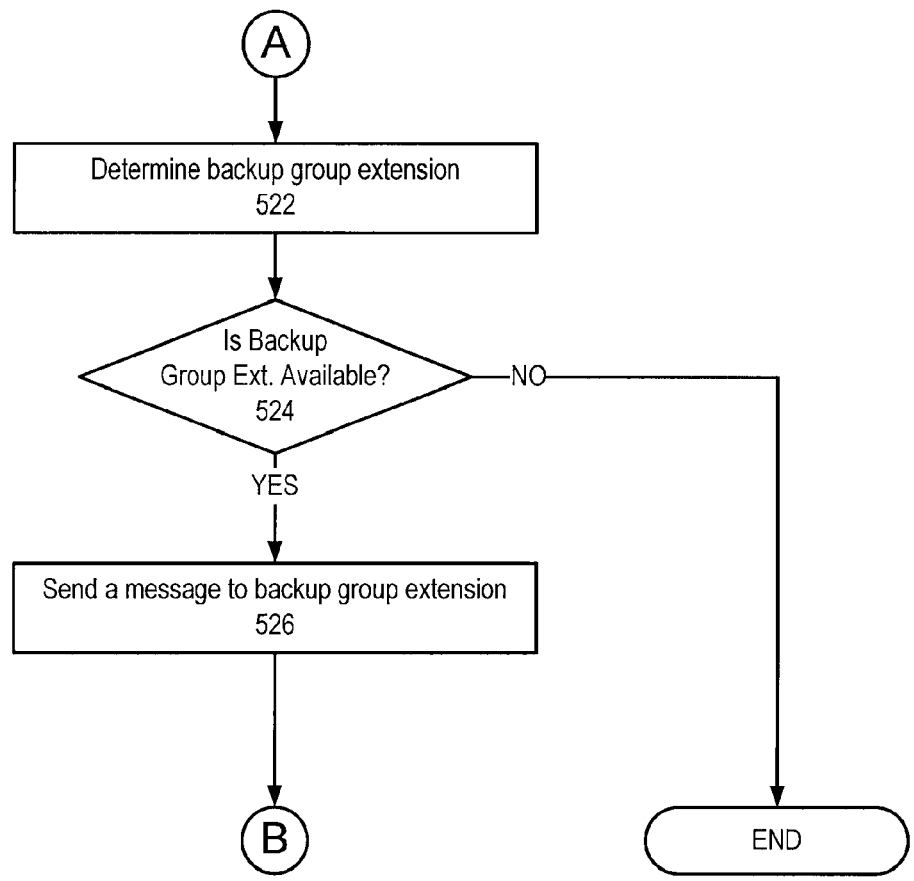

Referring now to FIGS. 5A and 5B, a method for performing call group pickup shown. Referring now to FIG. 5A, the method begins by receiving 502 an incoming call or a call offering. Next, the call manager 150 determines 504 the destination extension for the call. The call manager 150 determines 506 whether the destination extension is part of a group extension. The method determines 508 whether the group extension determined in step 506 is available. If not, the method proceeds to step 522 of FIG. 5B as will be described in more detail below. If the method determined in step 508 that the group extension was available, the method continues by sending 510 a message to the group extension. In one embodiment, the message includes an identification of the call, and is sent for processing to the group pickup module 302. Additionally, information about the call is stored in the group pickup call stack 308. Next, the method proceeds to determine 512 whether a "pickup" signal has been received by the pickup group. The pickup command can be issued from any phone (it need not belong to pickup group ext list.) When the pickup command is issued on a pickup group, then the first call in pickup group stack is picked up and redirected to the extension that issued the pickup command. If a "pickup" signal has been received, the method continues to determine 514 whether the call is present. In some circumstances, there may be an amount of time that passes after the incoming call is received (step 502) and before a user inputs a call pickup signal. This may cause the caller to end the call in which case the call will longer be present. If it is determined in step 514 that the call is no longer present, then the method tries to pickup 515 the next call in the pickup group stack. Then the method determines 517 if there are any calls in the pickup group stack. If there are, the next call in the stack is picked up and the method continues in step 516 to redirect the call. If there are no calls in the pickup group stack then the method is complete and ends. On the other hand, if it is determined in step 514 that the call is present, the method redirects 516 the call to the extension that input the pickup signal after which the method is complete. It should be noted that once the call is redirected, the group pickup call stack 308 is updated to reflect that the call is gone. In another embodiment, each of the extensions in the group extension list receives an indication that the call is gone and deletes the call from their offering call list.

If in step 512 it was determined that the pickup signal was not received, the method continues in step 518 to determine whether the call is still present. If the call is no longer present, the method is complete and ends. However, if the call is present in step 518, the method continues by sending a "keep alive" signal to the group pickup call stack 308 after which the method loops to step 512 to continue to test for a pickup signal.

As noted above, the present invention is particularly advantageous because it provides fault tolerance for the call group picked up functionality. If it is determined in step 508 that the group extension is no longer available (such as because the switch corresponding to the group pickup is no longer available), the method continues in step 522 of FIG. 5B. In step 522, the method determines the backup group extension corresponding to the determined group extension from step 506. Next, the method determines 524 whether the backup group extension is available. If not, both the primary and secondary group extensions are not available and despite the redundancy of the secondary group there is a failure. In an alternate embodiment, the backup group pickup module 312 maintains a list of several secondary group extensions. In such a case, the method attempts to send a message to each of the secondary group extensions in sequence until the available secondary group extensions are exhausted. If the backup group extension is determined to be available in step 524, the method continues by sending 526 a message to the backup group extension. Once received, the group into a module corresponding to the backup group extension processes the message in a manner similar to that described above with reference to steps 510 to 520.

Figure 4:
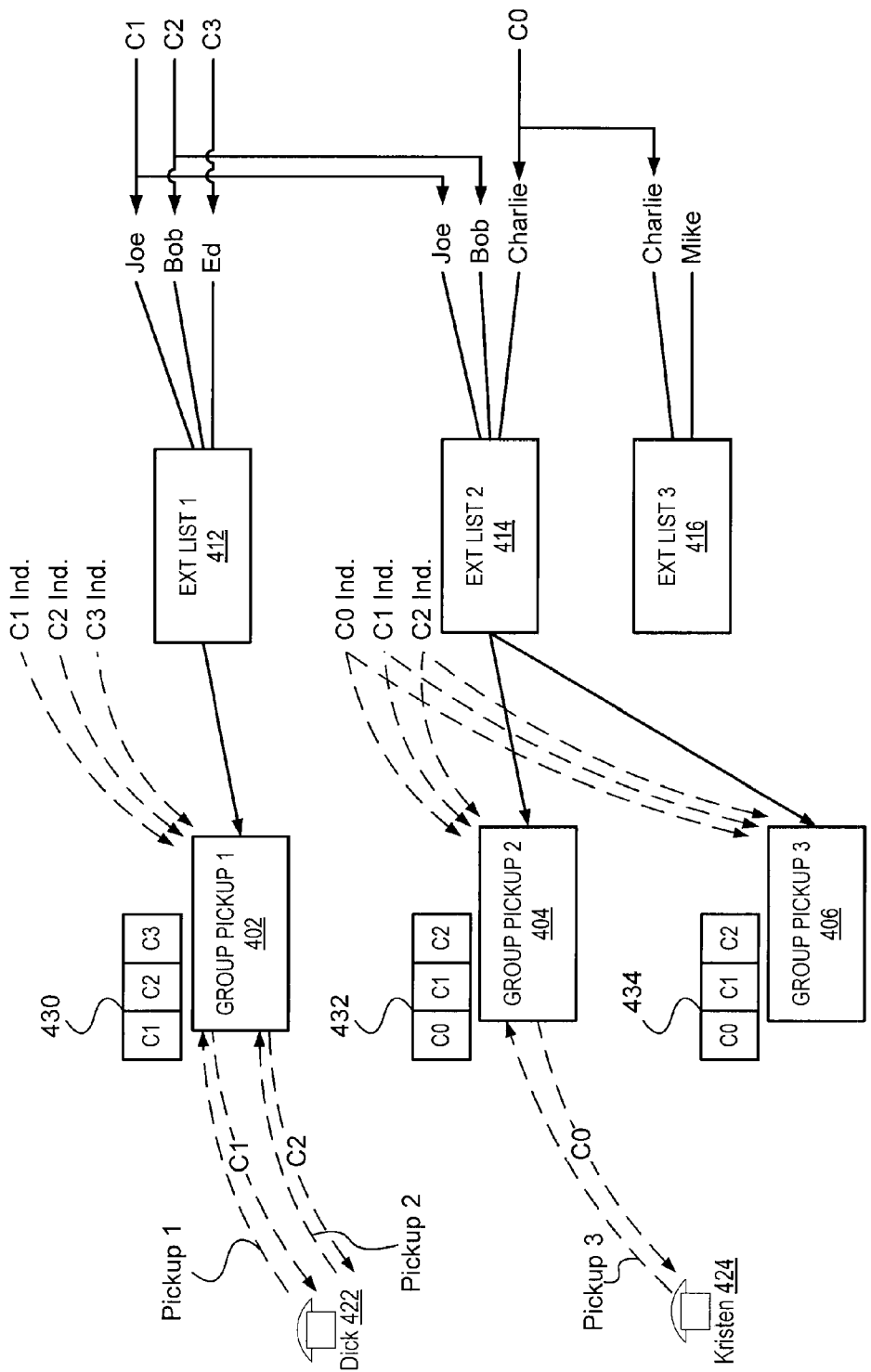
FIG. 4 is a functional block diagram showing an example of calls, extension lists, group pickups, connections and indications created and terminated by operation of a call pickup group according to one embodiment of the present invention.

Referring now to FIG. 4, an example of a distributed telephony system 400 utilizing the present invention is shown. In particular, FIG. 4 shows a diagram illustrating an example in which there are: four incoming calls labeled C0, C1, C2 and C3 with the number indicating the order in which the calls are received; a plurality of extensions identified by the names of the users of those extensions, Joe, Bob, Ed, Charlie, Mike; three extension lists 412, 414 and 416; three group pickup modules 402, 404 and 406; three corresponding group pickup call stacks 430, 432 and 434; and additional extensions used for pickup, Dick 422 and Kristen 424. FIG. 4 illustrates how calls are processed by the present invention.

The calls are evaluated and the destination extension for each call is determined. For example, call C0 is the first call received and the destination extension is Charlie. Then call C1 is received and the destination extension is Joe, call C2 is received and the destination extension is Bob, and finally, called C3 is received and the destination extension is Ed. As indicated by the lines between the destination extensions (names) and the extension lists 412, 414 and 416 each of the extensions is associated with a different group extension list.

The first extension list 412 includes Joe, Bob and Ed. The second extension list 414 includes Joe, Bob and Charlie. Finally, the third extension list 416 includes Charlie and Mike.

Each of the extension lists 412, 414 and 416 is or may be assigned to a group pickup module 402, 404 and 406. In this example, the first extension list 412 is assigned to the first group pickup module 402. The second extension list 414 is assigned to the second group pickup module 404 and the third group pickup module 406. This illustrates how the system 195 of the present invention provides redundancy and failover especially where the second group pickup module 404 is associated with a first switch and the third group pickup module 406 is associated with a different, second switch. After the destination extension is determined for each call C0, C1, C2 and C3, call indications or call offerings are sent to the group pickup module 402, 404 and 406 associated with the extension list 412, 414 and 416. For example, since Joe, Bob and Ed are included in the first extension list 412, call indications for calls C1, C2 and C3 are sent in that order to the first group pickup module 402. Similarly, call indications for calls C0, C1 and C2 are sent in that order to the second and third group pickup modules 404 and 406. The order of the calls is also reflected in the group pickup call stacks 430, 432 and 434.

Assuming that another user at another extension, Dick 422, wants to issue a command to pick up a call from a group extension then Dick 422 can pickup calls associated with the first extension list 412. Dick and Kristen need not be part of any extension lists 1, 2 or 3 in order to issue a pickup command 1, 2 or 3. As illustrated in FIG. 4, Dick 422 can use any extension and input a pickup signal, Pickup 1, to the system 195. The pickup signal is received and processed by the first group pickup module 402. The first group pickup module 402 identifies the oldest call within its group pickup call stack 430 and redirects the call to Dick's extension. The first group pickup module 402 also removes call C0 from the group pickup call stack 430. Next, Dick 422 inputs another pickup signal, Pickup 2, to the system 195. Again, the pickup signal is received and processed by the first group pickup module 402. The first group pickup module 402 identifies the oldest call within its group pickup call stack 430 (now call C2) and redirects the call to Dick's extension. If at some later time, a third call pickup signal, Pickup 3, is input by another extension Kristin 424, this call pickup signal is sent to and processed by the second group pickup module 404. In response, the second group pickup module 404 redirects the oldest call (call C0) within its group pickup the call stack 432. The example of FIG. 4 illustrates the general operation of the present invention consistent with the description of the extension module 204 of FIG. 3 and flowchart of FIGS. 5A and 5B.

FIG. 4 also illustrates how the present invention allows the pickup command issuer and the members in the pickup group to be located anywhere in the system 195 which means they need not be physically located near each other. The present invention handles both the case where the user who issues pickup command (like Dick 422 or Kristen 424) is physically located in the same site as pickup group members (members in the extension list associated with the pickup group); so when Dick 422 or Kristen 424 hear a pickup group member's phone ring, they issue pickup command on the group number; as well as the case where Dick 422 or Kristen 424 are at a remote location from Joe, Bob, Ed, Charlie and Mike, but are notified of an incoming call to a pickup group extension and send a pickup command with the call being redirected to their location.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A system for providing group pickup in a telephony system, the system comprising:
    an extension list including a group pickup list;
    a monitoring group pickup module for receiving an incoming call, determining a destination extension and determining other extensions in the same group pickup list as the destination extension, the monitoring group pickup module generating an indication signal that provides information necessary to redirect the incoming call, the monitoring group pickup module coupled to access the extension list;
    a group pickup call stack for storing information about incoming calls until they are redirected; and
    a group pickup module for receiving the indication signal and a pickup signal and processing the incoming call to redirect the incoming call to an extension that sent the pickup signal using the indication signal generated by the monitoring group pickup module, managing the group pickup call stack, receiving a keep alive signal corresponding to a pending call stored in the group pickup call stack, and removing the pending call from the group pickup call stack if the keep alive signal is not received for the pending call within a predetermined amount of time, the group pickup module coupled to the monitoring group pickup module to receive the indication signal, and the group pickup module coupled to the extension to receive the pickup signal and redirect the incoming call and adapted for communication with the group pickup call stack.

2. The system of claim 1 wherein the group pickup module is part of a call manager.

3. The system of claim 1 wherein the group pickup module is part of an extension module of a call manager.

4. The system of claim 1 further comprising a second group pickup module for processing calls associated with a second group pickup list, and wherein the extension list includes the second group pickup list.

5. The system of claim 4 wherein the group pickup module is operational as part of a first switch and the second group pickup module is operational as part of a second switch.

6. The system of claim 1 further comprising a backup group pickup module for providing a failover mechanism, the backup group pickup module coupled to receive a signal indicating a primary group list is not available from the monitoring group pickup module and forwarding the incoming call to a secondary group list when the primary group list is not available, the backup group pickup module adapted for communication with the group pickup module and the monitoring group pickup module.

7. The system of claim 1 wherein:
the group pickup module, the monitoring group pickup module and the extension list are operational as part of a first switch;
the extension list includes a first endpoint coupled to the first switch and a second endpoint coupled to a second switch; and
the group pickup module is coupled to receive the pickup signal from one of the first endpoint and the second endpoint and redirect the incoming call to the one of the first endpoint and the second endpoint.

8. The system of claim 1 wherein:
the extension list includes the group pickup list and a second group pickup list; and
the system further comprises an endpoint having an extension number and the extension number is included in both the group pickup list and the second group pickup list.

9. A method for performing call group pickup by a call manager having a group pickup module, the method comprising:
receiving an incoming call;
determining with the call manager a first extension for the incoming call;
determining by the call manager whether the first extension is included in a group pickup list;
receiving by the group pickup module a pickup signal from a second extension;
storing information about the incoming call until it is redirected in a group pickup call stack;
redirecting using the group pickup module the incoming call to the second extension using an indication signal that provides information necessary to redirect the incoming call;
receiving a keep alive signal corresponding to a pending call stored in the group pickup call stack; and
removing the pending call from the group pickup call stack if the keep alive signal is not received for the pending call within a predetermined amount of time.

10. The method of claim 9, wherein the call manager and the group pickup module are operational on a first switch and the second extension is operational on a second switch.

11. The method of claim 9, further comprising:
determining a switch for the group pickup list and determining whether the switch is operational;
if the switch is operational, sending a message to a group extension; and
if the switch is not operational, determining a backup group extension and sending the message to the backup group extension.

12. The method of claim 9, further comprising:
determining whether the incoming call is present; and
sending the keep alive signal if the incoming call is present.

13. The method of claim 9, further comprising sending a message to the group pickup list.

14. The method of claim 13 further comprising storing the indication signal in a call stack, and wherein redirecting the incoming call also includes removing the indication signal from the call stack.

15. The method of claim 9, further comprising monitoring for the pickup signal and determining whether the incoming call is still present.

16. A non-transitory computer-readable storage medium storing instructions that when executed by a computer cause the computer to perform a method of performing call group pickup, the method comprising:
receiving an incoming call;
determining with a call manager a first extension for the incoming call;
determining by the call manager whether the first extension is included in a group pickup list;
receiving by a group pickup module a pickup signal from a second extension;
storing information about the incoming call until it is redirected in a group pickup call stack;
redirecting using the group pickup module the incoming call to the second extension using an indication signal that provides information necessary to redirect the incoming call;
receiving a keep alive signal corresponding to a pending call stored in the group pickup call stack; and
removing the pending call from the group pickup call stack if the keep alive signal is not received for the pending call within a predetermined amount of time.

17. The non-transitory computer-readable storage medium of claim 16, wherein the call manager and the group pickup module are operational on a first switch and the second extension is operational on a second switch.

18. The non-transitory computer-readable storage medium of claim 16, further comprising:
determining a switch for the group pickup list and determining whether the switch is operational;
if the switch is operational, sending a message to a group extension; and
if the switch is not operational, determining a backup group extension and sending the message to the backup group extension.

* * * * *